United States Patent [19]
Aparicio, IV et al.

[11] Patent Number: 6,052,679
[45] Date of Patent: Apr. 18, 2000

[54] ARTIFICIAL NEURAL NETWORKS INCLUDING BOOLEAN-COMPLETE COMPARTMENTS

[75] Inventors: Manuel Aparicio, IV, Chapel Hill; Yen-Min Huang, Raleigh, both of N.C.

[73] Assignee: International Business Machines Corporation, Armonk, N.Y.

[21] Appl. No.: 08/927,776

[22] Filed: Sep. 11, 1997

[51] Int. Cl.$^7$ ............................. G06N 3/00; G06N 3/06
[52] U.S. Cl. ............................................. 706/15; 706/26
[58] Field of Search ............................. 706/25, 26, 43, 706/41

[56] References Cited

U.S. PATENT DOCUMENTS

| | | | |
|---|---|---|---|
| 3,950,733 | 4/1976 | Cooper et al. | 706/26 |
| 4,044,243 | 8/1977 | Cooper et al. | 706/15 |
| 4,254,474 | 3/1981 | Cooper et al. | 706/41 |
| 4,326,259 | 4/1982 | Cooper et al. | 708/212 |
| 4,660,166 | 4/1987 | Hopfield | 708/801 |
| 4,760,604 | 7/1988 | Cooper et al. | 382/155 |
| 4,897,814 | 1/1990 | Clark | 365/49 |
| 4,943,931 | 7/1990 | Allen | 706/41 |
| 4,972,363 | 11/1990 | Nguyen et al. | 708/801 |
| 5,033,006 | 7/1991 | Ishizuka et al. | 706/25 |
| 5,113,367 | 5/1992 | Marrian et al. | 708/813 |
| 5,148,385 | 9/1992 | Frazier | 708/426 |
| 5,265,224 | 11/1993 | Maruno | 706/31 |
| 5,357,597 | 10/1994 | Aparicio, IV et al. | 706/25 |
| 5,517,597 | 5/1996 | Aparicio, IV et al. | 706/26 |

OTHER PUBLICATIONS

Klaus–Uwe Hoffgen and Hans Ulrich Simon, Robust Trainability of Single Neurons, 92 Proc. of the 5th Annual ACM Workshop on Computational Learning Theory 428–39, Jul. 1992.

Ivan Stojmenovic, Completeness Criteria in Many–Valued Set Logic under Compositions with Boolean Functions, 94 Proc. of the 24th International Symposium on Multiple–Valued Logic 177–83, May 1994.

*Primary Examiner*—Tariq R. Hafiz
*Assistant Examiner*—Michael Pender
*Attorney, Agent, or Firm*—Myers Bigel Sibley & Sajovec; Jeanine Ray-Yarletts

[57] ABSTRACT

Artificial neural networks include a plurality of artificial neurons and a plurality of Boolean-complete compartments, a respective one of which couples a respective pair of artificial neurons. By providing Boolean-complete compartments, spurious complement memories can be avoided. A Boolean-complete compartment includes a collection of at least four Boolean functions that represent input vectors to the respective pair of artificial neurons. The collection of at least four Boolean functions are selected from sixteen possible Boolean functions that can represent input vectors to the respective pair of artificial neurons. A count for each of the at least four Boolean functions is also provided. The count represents a number of occurrences of each of the at least four Boolean functions in input vectors to the respective pair of artificial neurons. In order to read the artificial neural network, the network also includes a collection of transfer functions, a respective one of which is associated with a respective one the sixteen possible Boolean functions.

36 Claims, 4 Drawing Sheets

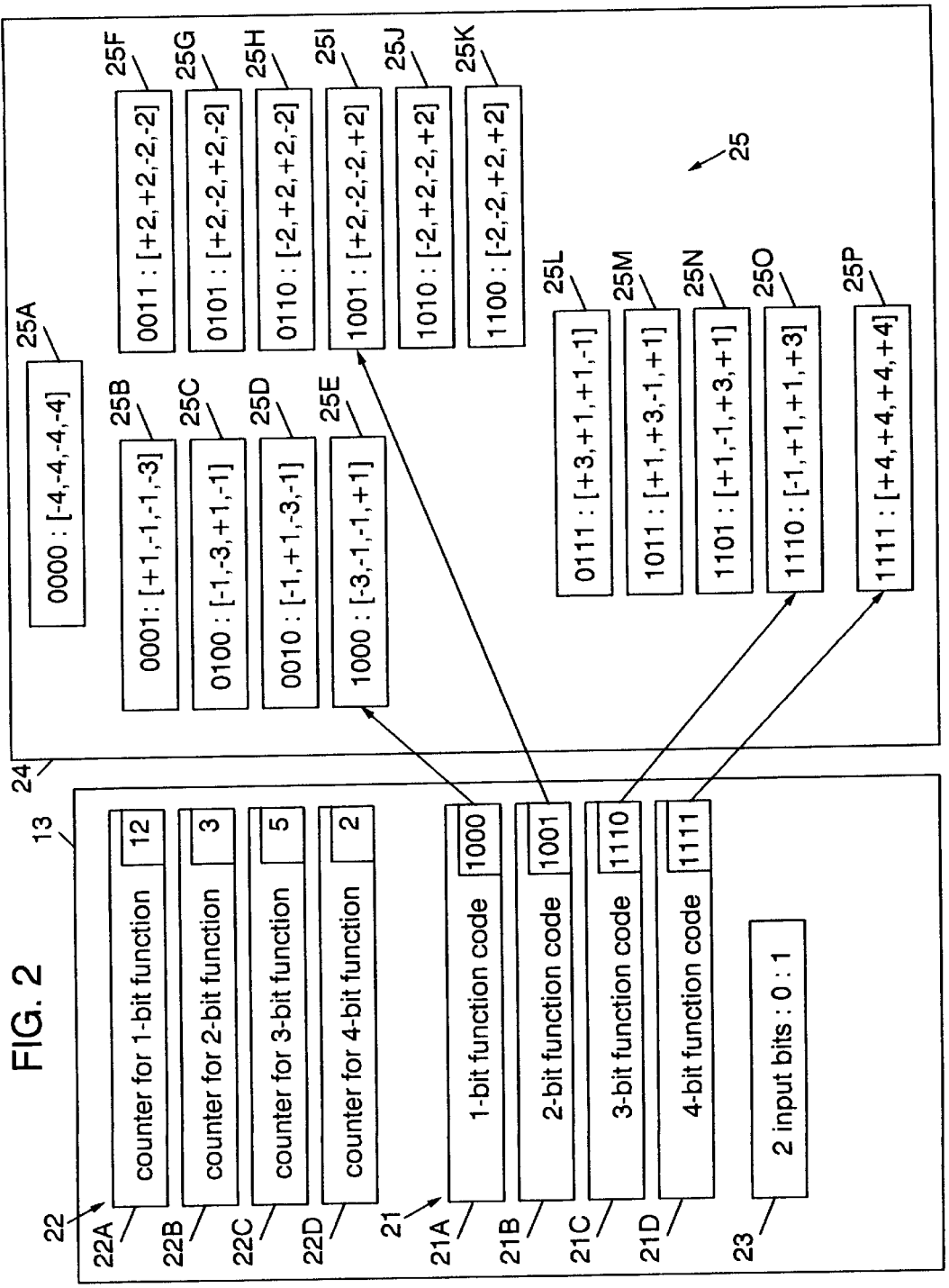

ARTIFICIAL NEURAL NETWORKS INCLUDING BOOLEAN-COMPLETE COMPARTMENTS

FIELD OF THE INVENTION

This invention relates to artificial intelligence systems, methods and computer program products, and more particularly to artificial neural network systems, methods and computer program products.

BACKGROUND OF THE INVENTION

Associative memories, also referred to as content addressable memories, are widely used in the field of pattern matching and identification, expert systems and artificial intelligence. A widely used associative memory is the Hopfield artificial neural network. Hopfield artificial neural networks are described, for example U.S. Pat. No. 4,660,166 to Hopfield entitled "Electronic Network for Collective Decision Based on Large Number of Connections Between Signals".

In general, a Hopfield artificial neural network comprises a plurality of artificial neurons, also referred to as nodes. One artificial neuron is generally provided for each input line of an input vector. One-to-one connections are provided between all artificial neurons. For a set of input attributes such as {A, B, C}, input vectors such as [101] or [100] may be loaded into the neural network. The neural network representation is found on the weights of the arcs between the neurons. These weights are initialized to 0. A storage prescription formula generally operates as follows: if both input bits of the corresponding nodes are the same, the weight is incremented by 1. Otherwise, the input bits are different and the weight is decremented by 1. This formula creates a memory with similarities to an Ising spin model from physics, in which given the spins of an array of electrons, there are stable states that the system will relax to if the electrons are allowed to toggle. The storage formula causes the network to store the loaded cases as such stable states, or attractors.

An important use of Hopfield networks is for autoassociative recall. That is, once a number of input vectors have been loaded or written as attractors into such a memory, a new vector can be clamped to the nodes, and by the following procedure, a loaded memory can be recalled or read from a partial or corrupted memory. Each node calculates the dot product of all other connected node's bipolar states and the respective connection weights. Specifically, each arc's weight is multiplied by +1 if the input bit is on or by −1 if off, and all these products are summed. Asynchronously, each node flips itself on if this dot product is positive or off if it is negative. Given a new case as an input vector, this procedure will change the bit patterns until the memory "relaxes" to an attractor, usually representing one of the loaded memories or a prototype of several memories. For instance, when loaded with several examples of handwritten 'O's, such a memory will tend to report the prototype 'O' if given any new, partial, or corrupted shape close to an 'O'.

Hopfield networks are widely used and are available in many commercial neural network packages. However, their application may be limited by their poor capacity. Very large virtual machines, up to 1000 bits and more, have been built, but in practice, these memories appear capable of only 0.15N attractors. The theoretical limit is 2N.

Another important limitation in Hopfield neural networks is spurious memories. If the new vector is close enough to a loaded memory, then the relaxation technique will recall the loaded memory based on the new vector. In mathematical terms, if the Hamming distance (sum of binary differences) between the new vector and the address of the attractor are close enough relative to the size of the entire Boolean space, then Hopfield networks work appropriately. Unfortunately, however, the storage prescription formula may also cause spurious attractors—false memories—to be created in the weight space as well.

The creation of spurious memories in a neural network may be illustrated by the following example. Although Hopfield networks may be best illustrated in very large networks, the basic problem of spurious memories can be seen with only three neurons. Consider the input set {A, B, C} and the ordered input vector [111]. The prescription formula would load this vector so that $weight_{AB}=weight_{AC}=weight_{BC}=+1$.

Reading this loaded case from a new case such as [110] may be performed without spurious error. From the perspective of the A node, the dot product=0. A makes no change. The same is true for the B node. However, the C nodes dot product is $(1*1+1*1)=+2$. While the given input bit is off, this dot product means that it should be on. Flipping C ON relaxes the network in the sense that all dot products are positive and all bits are ON, as they should be according to the loaded memory.

However, if the vector [000] is input, the dot products are all negative and the bits all off. This is a stable-state attractor (the vector [001] will move to it too). However, it is spurious because it was never loaded as an actual case.

Although it may be difficult to provide a perfect associative memory that is tractable to large space unless P=NP, a spurious memory as illustrated above may be particularly problematic. Specifically, some reasonable (and maybe even "good") error may be expected in associative memories, but such unreasonable memories are troublesome. In general, Hopfield networks tend to spurious attractors that are the compliment of the intended attractors. In this case, the intended attractor at [111] also produced a spurious attractor at [000]. Thus, an input that is opposite to the intended input will also give a positive result. Spurious complement memories may be particularly troublesome for pattern matching, artificial intelligence and other applications of neural networks.

SUMMARY OF THE INVENTION

It is therefore an object of the present invention to provide improved artificial neural network systems, methods and computer program products.

It is another object of the present invention to provide artificial neural network systems, methods and computer program products that have reduced susceptibility to spurious memories.

It is still another object of the present invention to provide artificial neural networks systems, methods and computer program products that can exhibit reduced susceptibility to spurious memories that are the complement of intended attractors.

These and other objects are provided, according to the present invention, by artificial neural networks that include a plurality of artificial neurons and a plurality of Boolean-complete compartments, a respective one of which couples a respective pair of artificial neurons.

It has been realized, according to the present invention, that a conventional Hopfield neural network only accounts for two Boolean functions. In other words, the weight formula that is generally used for a Hopfield network is that if the two inputs are same, the weight goes up, otherwise the weight goes down. In Boolean function terms, the weight$_{AB}$ equals the number of XOR relationships of AB minus the number of XNOR relationships.

According to the present invention, rather than accounting for only these two Boolean functions, an accounting can extend to all 16 Boolean functions that are possible between any two variables. By providing Boolean-complete compartments, spurious complement memories can be avoided.

In preferred embodiments of the present invention, a Boolean complete compartment includes a collection of at least four Boolean functions that represent input vectors to the respective pair of artificial neurons. The collection of at least four Boolean functions are selected from sixteen possible Boolean functions that can represent input vectors to the respective pair of artificial neurons. A count for each of the at least four Boolean functions is also provided. The count represents a number of occurrences of each of the at least four Boolean functions in input vectors to the respective pair of artificial neurons.

The collection of at least four Boolean functions preferably is four Boolean functions. Accordingly, it has been found, according to another aspect of the invention, that a Boolean-complete compartment may be represented by accumulating counts for four Boolean functions that can represent all sixteen possible Boolean functions for a pair of artificial neurons.

Preferably, the count represents a count of ALWAYS functions included in the input vectors, a count of residual OR functions remaining in the input vectors after counting the ALWAYS functions, a count of residual two bit functions (including XOR functions, XNOR functions and the single term functions A, NOTA, B and NOTB) remaining in the input vectors after counting the ALWAYS and OR functions and a count of residual AND functions remaining in the input vectors after counting the ALWAYS, OR and two bit functions.

Neural networks according to the invention select a collection of at least four Boolean functions that represent input vectors to a respective pair of artificial neurons, and accumulate a count for each of the selected functions. An indication of the selected collection of Boolean functions and the corresponding accumulated counts are stored in the associated compartment.

The sixteen possible Boolean functions that can represent input vectors to the respective pair of artificial neurons are preferably represented as a four-bit bitwise OR of the input vectors represented by the Boolean function. In order to select the collection of at least four Boolean functions from the full set of sixteen possible Boolean functions, the at least four Boolean functions are ANDed with an input vector and a largest Boolean function that is true when bitwise ANDed with the input vector is identified. The count of the largest Boolean function so identified is decremented and the count of the next Boolean function following the largest Boolean function is incremented.

In order to read the artificial neural network, the network further comprises a collection of transfer functions, a respective one of which is associated with a respective one of the sixteen possible Boolean functions. In response to an input vector, the artificial neural network is read by combining the input vector, the counts and the associated transfer functions for the plurality of compartments. In particular, a dot product of an input vector to a respective pair of neurons, the transfer functions of the at least four Boolean functions of the compartment that is associated with the respective pair of neurons, and the counts of the compartment that is associated with the respective pair of neurons is calculated. The dot products of the input vectors so calculated are then averaged in order to read the neural network.

Neural networks according to the present invention may therefore have a reduced susceptibility to spurious complement memories, without adding undue complexity to the design or operation of the neural networks. It will be understood that the present invention may be embodied as systems, methods and computer program products, and combinations thereof.

BRIEF DESCRIPTION OF THE DRAWINGS

FIG. 2 illustrates a representation of a compartment of a neural network of FIG. 1.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described using the illustrations of FIGS. 1–5. It will be understood that each element of the illustrations, and combinations of elements in the illustrations, can be implemented by general and/or special purpose hardware-based systems which perform the specified functions or steps, or by combinations of general and/or special purpose hardware and computer instructions.

These program instructions may be provided to a processor to produce a machine, such that the instructions which execute on the processor create means for implementing the functions specified in the illustrations. The computer program instructions may be executed by a processor to cause a series of operational steps to be performed by the processor to produce a computer implemented process such that the instructions which execute on the processor provide steps for implementing the functions specified in the illustrations. Accordingly, FIGS. 1–5 support combinations of means for performing the specified functions, combinations of steps for performing the specified functions and program instruction means for performing the specified functions.

Figure 1:
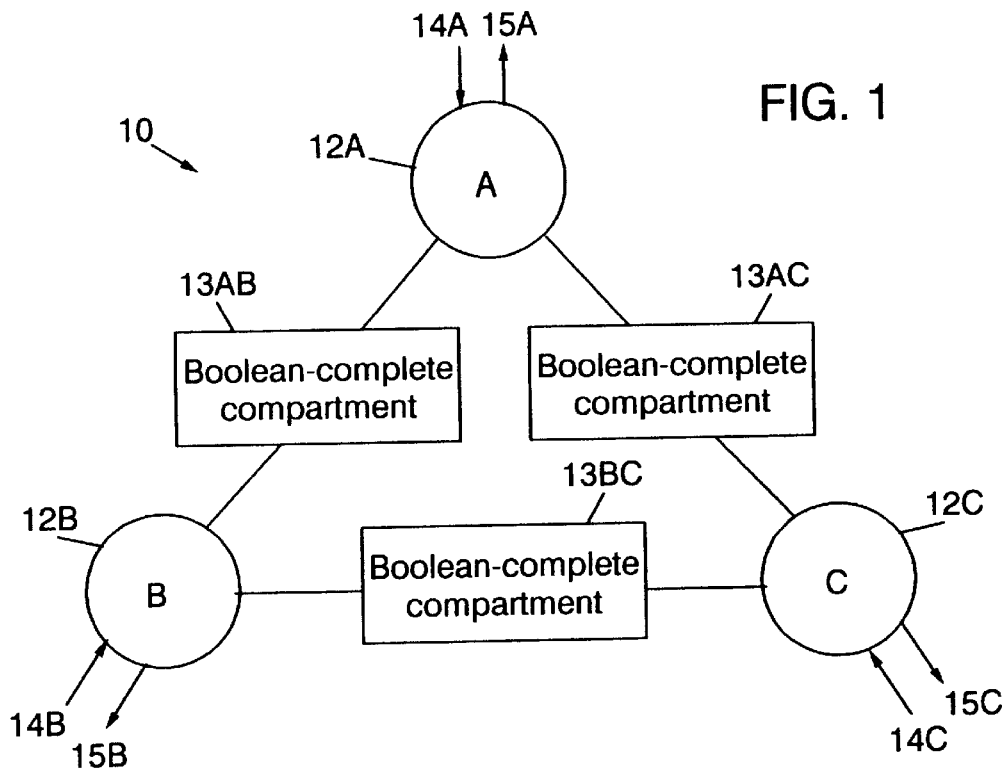
FIG. 1 is a block diagram of artificial neural networks according to the present invention.

Referring now to FIG. 1, artificial neural networks according to the present invention will now be described. Artificial neural network 10 includes a plurality of artificial neurons 12. In FIG. 1, only three artificial neurons 12A, 12B and 12C are shown for ease of illustration. However, it will be understood that neural networks generally include many more than three neurons.

Still referring to FIG. 1, each neuron 12A–12C includes an input 14A–14C and an output 15A–15C. The inputs 14 are generally a single bit and the output is generally a multi-bit number, as will be described in detail below.

Still referring to FIG. 1, a plurality of Boolean-complete compartments 13 are provided. A respective Boolean compartment couples a respective pair of artificial neurons. Thus, Boolean-complete compartment 13AB couples artificial neurons 12A and 12B. Boolean-complete compartment 13BC couples artificial neurons 12B and 12C, and Boolean-complete compartment 13AC couples artificial neurons 12C and 12A.

In contrast with conventional Hopfield neural networks, which upon analysis appear only to consider two Boolean functions, the present invention provides a Boolean-complete compartment between respective pairs of artificial neurons. The Boolean-complete compartment can provide a complete representation of the sixteen possible Boolean functions of the input vectors to the respective pair of artificial neurons. Accordingly, by providing a Boolean-complete compartment, spurious complementary memories may be reduced and preferably eliminated.

Referring now to FIG. 2, a representation of a compartment 13 of FIG. 1 will now be described. As shown in FIG. 2, the compartment 13 includes a collection 21 of at least four Boolean functions that represent input vectors to the respective pair of artificial neurons. The collection is selected from sixteen possible Boolean functions that can represent input vectors to the respective pair of artificial neurons. As shown in FIG. 2, the collection of at least four Boolean functions preferably is a collection of four Boolean functions 21A–21D that represent the sixteen possible Boolean functions that can represent input vectors to the respective pair of artificial neurons. As will be described in detail below, the four Boolean functions are represented by one-bit function code 21A, a two-bit function code 21B, a three-bit function code 21C and a four-bit function code 21D.

As also shown in FIG. 2, a collection 25 of the sixteen possible function codes and transfer functions for the function codes may be stored separately for the neural network in a common storage area 24, outside the compartment 13, because the function codes and transfer functions are generally the same for all of the artificial neurons. The function codes and transfer functions will be described in detail below. However, it can be seen from FIG. 2 that the selected one-bit function code 21A can point to one of four possible one-bit function codes 25B–25E. Similarly, the selected two-bit function code 21B can point to one of six possible two-bit function codes 25F–25K. The selected three-bit function code 21C can point to one of four possible three-bit function codes 25L–25O and the selected four-bit function code 21D can point to only one possible function code 25P.

Still referring to FIG. 2, also included compartment 13 is a collection of counters 22, a respective one of which stores a count for a respective one of the at least four Boolean functions 21. Thus, counter 22A stores a count of a number of occurrences of the one-bit function code which is identified in 21A. Counter 22B stores a count for the two-bit function, the code of which is identified at 21B. Counter 22C stores counts for the three-bit function code that is identified at 21C, and counter 22D stores counts of the four-bit function code that is identified at 21D. As also shown in FIG. 2, compartment 13 also stores the input vector 23 for the pair of neurons. The input vector corresponds to the input bits 14 which are provided to the respective pair of artificial neurons that are coupled to the compartment 13.

A description of memorizing or writing into neural networks according to the present invention will now be provided. Then, reading will be described.

Writing

Neural networks according to the present invention also referred to herein as a memory, may provide heteroassociative prediction. That is, given an input vector, the memory should provide a measure of the input's membership to the memory. For example, if the memory is labeled for some output such as "important" and the signature of important things are stored in this memory, then the degree of membership will signify the degree of predicted importance. The neuron's output strength provides its prediction strength. One compartment is provided for each one- to-one intersection of variables in the input vector. For example, one compartment will be responsible for accounting the functions between A and B. In terms of Hopfield networks, each arc contains one such compartment rather than just a simple weight.

Assume that each compartment holds a 2×2 matrix. Each cell in the matrix represents one of the 4 possible cases between A and B as follows:

| !A B | A B |
|---|---|
| !A!B | A!B |

Each cell in the matrix will store a count of the cases loaded into the memory. As with the weights of a Hopfield Network, all cell values are preferably initialized to 0. With these counts at 0, the network knows nothing—and knows that it knows nothing.

As cases are loaded into the memory, the appropriate counter is incremented. The effect is to provide a tomography of the real Boolean space in which each pair-wise view of the counts gives one of $(N^2-N)/2$ perspectives of the Boolean space. This is called "case counting" because the counters are mapped to one of 4 cases in this 2×2 matrix.

As will be described below, the 2×2 matrix may not be the most efficient representation of a compartment. On the other hand, this perspective of the 2×2 matrices demonstrates how confidence can be measured.

Given a 2×2 matrix of binomial data instances, Yate's $\chi^2$ (Chi-squared) Test is a non-parametric confidence measure of the matrix' statistical significance. This will be further discussed below, but note that $\chi^2$ probability of this matrix is sensitive both to the number of observations in the matrix as well as their distribution. In other words, the confidence associated with each compartment generally will be proportional to the age/experience of the compartment and proportional to the degree that the cases are "interesting" or informative, rather than random.

An efficient implementation of compartments should maintain the concept of updating counters. However, a more efficient representation may be provided, as will now be described. The first step is to count Boolean functions rather than raw cases, but with no loss of information from the case counting. For instance, the following several matrixes of case counts may be provided:

| 1 | 1 | 10 | 10 | 10 | 6 |
|---|---|---|---|---|---|
| 0 | 1 | 0 | 10 | 0 | 10 |

The first set of 3 cases can be compressed into one function, (A OR B). The second matrix of 30 memories can be expressed as 10*(A OR B). Of course such regularity of association is highly improbable, although they are possible and would generate a very, very high confidence in the A OR B function. Situations more toward the third matrix are more likely. This arrangement is still nearly regular but shows how such counts can still be decomposed and compressed into function counts In this case, 6*(A OR B)+4*(A XNOR B) is a reasonable expression.

Thus, all sixteen functions are not simultaneously required to account for any arrangement of the compartment's counts. Only 4 functions at a time may be used for any decomposition because of mutual exclusions. For example, only one AND function (of the 4 possible) is possible at a time. Two AND functions are more compactly represented by other functions such as XOR.

This can provide a heuristic for decomposing the counts into functions. Functions that account for more positions should be represented first. Residual counts are then accounted by "smaller" and smaller functions until the there is no residual.

In other words, the maximum count across all four positions taken 4 at a time is represented as the number of ALWAYS functions. Next, the maximum count of any 3 cells taken 3 at a time should be attempted and represented as a number of OR functions. Cells taken 2 at a time can result in either the XOR/XNOR functions or the single term functions A, B, !A, or !B. Finally, only one cell can possibly have any counts left. If so, they would be represented as a count of an AND function. For example, the decomposition of the following matrix

| 11 | 7 |
|----|----|
| 0  | 13 | would result in 7*(A OR B)+4*(A XNOR B)+2*(A AND B) as an expression of the 7*3+4*2+2*1=31 cases.

This decomposition technique also need not be the actual algorithm to be used. While this technique results in Boolean function counts as compact representation, it is not truly an incremental transition function. The above technique may need to be reapplied to the raw case counts each time a new case is loaded. The representation is not as memory-less as it can be because the raw data should be maintained along with the representation in order to re-compute the next state.

Preferably, position coding of input vectors may be used to efficiently implement compartments. The shift to function counting can be captured by 4 counters, 22A–22D. Along with these 4 counts, reference is made to which of the 16 possible Boolean functions 24 these 4 counters represent. For 16 functions, each reference pointer uses at least 4 bits. However, there are many ways to use these 4 bits. Rather than simply placing the 16 functions in a table and using the table index as a binary code (Function 15=Table item B0111), a position code of the functions can be described to emulate the case counts that are being eliminated from real memory storage.

In particular, the representation of cases as "A!B" in the 2×2 matrix above can be replaced by the binary equivalents:

| [10] | [11] |
|------|------|
| [00] | [01] |

These binary position codes can then be represented as the decimal form of the binary codes:

| 2 | 3 |
|---|---|
| 0 | 1 |

Then, the decimal form can be used to left-shift a bit as a coding of the case position across 4 bits:

| C0100 | C1000 |
|-------|-------|
| C0001 | C0010 |

The 'C' prefix is used to designate that the bit pattern represents a case.

Figure 3:
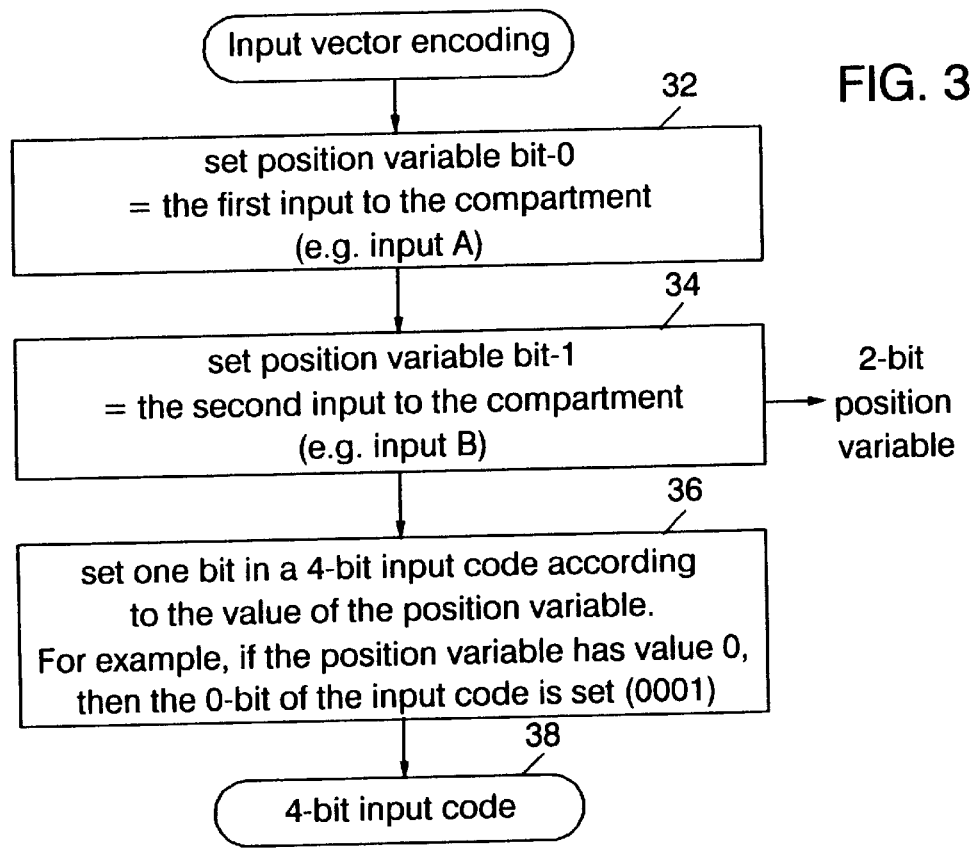
FIG. 3 illustrates input vector encoding according to the present invention.

Referring now to FIG. 3, input vector encoding according to the present invention will be described. The input vector 23 (FIG. 2) of a compartment 13 is obtained. At Block 32, the position variable bit 0 is equal to the first input to the compartment. For example, for compartment 13AB of FIG. 1, the position variable bit 0 is set equal to input A. Similarly, at Block 34, position variable bit 1 is set equal the second input to the compartment. In the above example, input B is used. Then, at Block 36, one bit in a four bit input code is set according to the value of the position Variable. For example, if the position variable has value 0, then the 0 bit of the input code is set. Four bit input codes are thus generated at Block 38.

Thus, each function is represented in 4 bits as the bitwise OR of the cases it represents. All Boolean functions are defined as such in the following Table 1, showing how the decimal index of the function is directly related to the binary representations:

TABLE 1

| 0  | F0000 | NEVER     |
|----|-------|-----------|
| 1  | F0001 | !A AND !B |
| 2  | F0010 | A AND !B  |
| 3  | F0011 | !B        |
| 4  | F0100 | !A AND B  |
| 5  | P0101 | !A        |
| 6  | F0110 | XOR       |
| 7  | F0111 | !A OR !B  |
| 8  | F1000 | A AND B   |
| 9  | F1001 | XNOR      |
| 10 | F1010 | A         |
| 11 | F1011 | A OR !B   |
| 12 | F1100 | B         |
| 13 | F1101 | !A OR B   |
| 14 | F1110 | A OR B    |
| 15 | F1111 | ALWAYS    |

The 'F' prefix is used to designate the bit patterns as functions. These functions represent the complete collection 25 of Boolean functions, at least four of which are selected at 21A–21D in compartment 13 of FIG. 2.

Now that the function code is equivalent to the position code for any case, the transition from one function to another may be performed efficiently at the level of bit operations, so that it can be very fast and amenable to hardware implementation. The transition function is definable as:

function$_{t0}$|case$_{t0}$ ⇒ function$_{t1}$

In other words, a current function is bitwise ORed with the current case in order to define the resulting new function that embeds the old cases with the new. For example:

F1100|C0010 ⇒ F1110

Finally, which of the 4 possible coexisting functions should assume the new case is specified. This is satisfied by reformulating the largest-function-first heuristic described above. However, there are no longer case counts to decompose. Assuming only the 4 function counts 22A–22D and 4 function pointers 21A–21D, the new case can be assimilated into the first function that does not already have it loaded, starting with the "largest" existing function first. This maintains the same nature of the heuristic. Moreover, finding the appropriate space can also be a bitwise operation:

$$\text{case} \in \text{function}_i \text{ if (case \& function}_i)$$

In other words, the case is contained already in the function if the bitwise ANDing of the case and function is not null.

Figure 4:
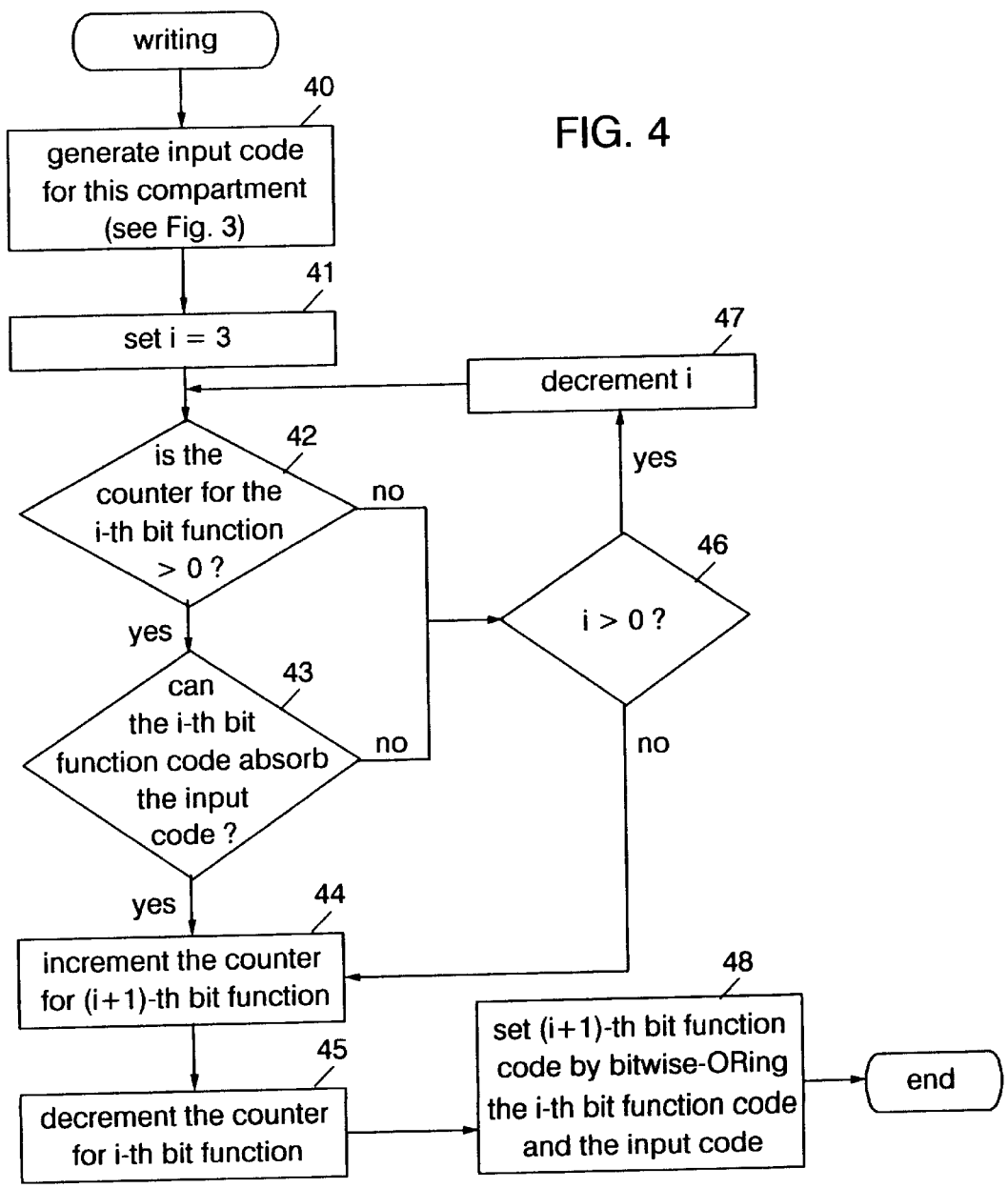
FIG. 4 illustrates writing in neural networks according to the present invention.

Referring now to FIG. 4, memorizing or writing of a plurality of input vectors according to the present invention will be described. As shown in FIG. 4, at Block 40, an input code is generated for the compartment using the input vector encoding of FIG. 3. A counter i is set to 3 at Block 41. At Block 42, a test is made as to whether the counter 22 for the i-th bit function is greater than 0. If not, and if at Block 46 i is still greater than 0, then i is decremented and the test at Block 42 is made again.

On the other hand, if the counter for the i-th bit function is greater than 0, then a test is made at Block 43 as to whether the i-th bit function code can absorb the input code. If yes, then the counter is incremented for the (i+1)-th bit function at Block 44 and the counter is decremented for the i-th bit function at Block 45. At Block 48, the (i+1)-th bit function is set by bitwise ORing the i-th bit function code and the input code. These operations are repeated for each compartment. The operations may be performed serially, but are preferably performed concurrently for each compartment.

Accordingly, memorizing or writing searches for the first largest function that is true when ANDed with the case, indicating an open "slot". That function's count is decremented and the next count is incremented. The next function is indicated by ORing the function with the case as previously described.

This automatic assignment of the "next" function and incrementing its count is an unexpected efficiency that may be obtained according to the present invention. The constraints between the functions within a compartment can guarantee that either the next function has not been defined or else its already has a count and any new promotion of smaller functions must be the same, allowing the count to simply be incremented in either case.

In summary, the neural network uses $O(N^2)$ number of compartments, one for each pairing of inputs. Each compartment 13 contains 4 function counts 22A–22D and 4 function codes 21A–21D, one for each count. The transition function is largely based on bitwise operators for assimilating each new case into this representation. This transition allows memory-less, incremental loads. Input vectors are thus memorized or written.

It will be understood that forgetting is a complement to memorizing, and need not be fully described. Briefly, forgetting a given case involves finding the smallest case that already has the case in its representation and bitwise ANDing the function with the compliment of the case to remove it.

$$\text{function}_{f0} \& \sim\text{case}_{f0} \Rightarrow \text{function}_{f1}$$

For example, $$\text{F1110} \& \sim\text{C0010} \Rightarrow \text{F1110} \& \text{C1101} \Rightarrow \text{F1100}$$

The function count is decremented and the previous function is incremented.

The forget function may be provided as part of the memory algorithm, but its use should be determined by the application. For instance, if the case result is flipped and becomes in opposition to the memory, the application should decide whether it has two opponent memories or just one. In other words, the application should decide whether it should store positive and negative cases or only positives. Also the application should determine whether the case should be loaded to one memory and removed from the other, or simply loaded into the opponent memory. In the latter decision, the reasoning is that the case has been seen more than once with opposite results. Both episodes were real and are validly remembered. However, if the agent's memory is to float with a dynamic environment, then memories that are valid at one time can be explicitly removed if their predictiveness is later found to be reversed.

Reading

A description of writing (memorizing) and erasing the memory has been provided. Reading of the memory will now be described. The memory can provide both auto- and heteroassociative output. Heteroassociative functions will be described first.

In general, the neural network also includes a collection of transfer functions 25 in a common storage area 24. A respective transfer function 25A–25F is associated with a respective one of the 16 possible Boolean functions. The artificial neural network is read in response to an input vector by combining the input vector, the counts and the associated transfer functions for the plurality of compartments. More specifically, a dot product of an input vector to a respective pair of neurons, the transfer functions of the at least four Boolean functions of the compartment that is associated with the respective pair of neurons and the counts of the compartment that is associated with the respective pair of neurons is calculated. The dot products of the input vectors so calculated are averaged for the plurality of neurons.

The memorize and forget functions represent the memory of cases themselves. Because the memory is not perfect—it does not perfectly separate what cases have been loaded from all other cases that have not—there is some inherent amount of generalization included in the memory. The memory should ideally be perfect and generalization should be reasoned from some metric when the memory is read. Thus, reading should use some measure of distance in the memory space. The transfer functions 25 may accomplish this objective.

As with writing and input encoding, this metric is developed from the local perspective of each compartment. Development of the transfer functions have three primary goals:

1. A distance metric for how far away any case is from the entire case- base of the memory.
2. An intuitive value so that the output provides a reasonable attribute in terms of cases.
3. A bipolar separation of what is probably a load case from what probably is not.

For example, the following matrices represent such a metric for some of the Boolean functions.

| -1 | 1  | -2 | 2 | 2  | -2 |
|----|----|----|---|----|----|
| -3 | -1 | -2 | 2 | -2 | 2  |

The first matrix represents an AND function. AB is the single loaded case and is given a weight=1. !AB and A!B are not in the memory and are given a weight=−1. !A!B is the exact complement of the AB memory and is given a weight=−3. The second matrix represents the linear function A, assuming the AB and A!B cases have been written. The general "weight" of A is a bipolarization of 2, representing the two cases in memory (or two not in memory). The last matrix represents the A XOR B function.

These transfer functions may be arbitrary, but may have a theoretical basis in periodic transfer functions that are described in U.S. Pat. Nos. 5,357,597 and 5,517,597,both entitled "Convolutional Expert Neural System (CONEXNS)" to the present co-inventor Aparicio et al., and assigned to the assignee of the present invention, the disclosure of which is hereby incorporated herein by reference Rather than calculate each transfer function based on the period, phase, and amplitude of Boolean functions, a reduction to only the 16 pair-wise Boolean functions according to the invention can allow a fast lookup table of each transfer function value as shown in Table 2:

TABLE 2

| 0  | {0,0,0,0}     | NEVER     |
|----|---------------|-----------|
| 1  | {+1,−1,−1,−3} | !A AND !B |
| 2  | {−1,+1,−3,−1} | A AND !B  |
| 3  | {+2,+2,−2,−2} | !B        |
| 4  | {−1,−3,+1,−1} | !A AND B  |
| 5  | {+2,−2,+2,−2} | !A        |
| 6  | {−2,+2,+2,−2} | XOR       |
| 7  | {+3,+1,+1,−1} | !A OR !B  |
| 8  | {−3,−1,−1,+1} | A AND B   |
| 9  | {+2,−2,−2,+2} | XNOR      |
| 10 | {−2,+2,−2,+2} | A         |
| 11 | {+1,+3,−1,+1} | A OR !B   |
| 12 | {−2,−2,+2,+2} | B         |
| 13 | {+1,−1,+3,+1} | !A OR B   |
| 14 | {−1,+1,+1,+3} | A OR B    |
| 15 | {+4,+4,+4,+4} | ALWAYS    |

Given this lookup table, each compartment reads its memory by calculating the dot product of its function counts with these transfer values, given any particular new case. For instance, assume the function counts

| (7*1) + (4*2) + (2*−3) = 9   | (7*3) + (4*−2) + (2*−1) = 11 |
| (7*−1) + (4*−2) + (2*−1) = −17 | (7*1) + (4*2) + (2*1) = 17 |

7*(A OR B)+4*(A XOR B)+2*(A AND !B) represented in earlier description. Reading the case [11] from this memory would result in a multibit output of (7*3)+(4*−2)+(2*−1)=11.

Figure 5:
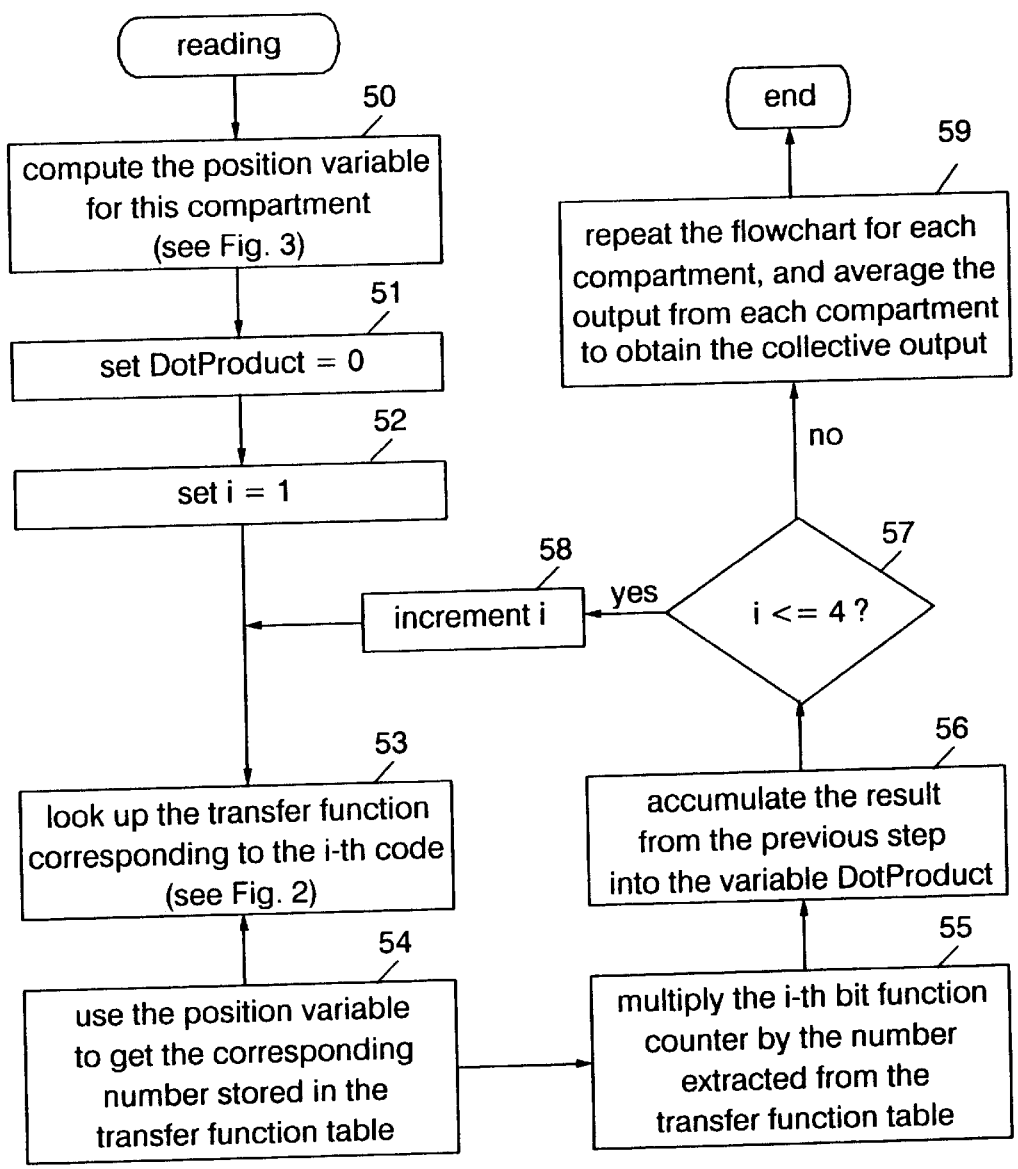
FIG. 5 illustrates reading of neural networks according to the present invention.

Referring now to FIG. 5, reading of an output from the neural network will now be described. At Block 50, the position variable for the compartment is computed by performing the operations of FIG. 3. The DotProduct variable is set to 0 at Block 51 and a counter i is set to 1 at Block 52. At Block 53, the transfer function 25A–25P corresponding to the i-th function code is obtained. The position variable is then used to get the corresponding number stored in the transfer function table at Block 54. The i-th bit function counter 22A–22D is multiplied by the number extracted the transfer function table at Block 55. The result is accumulated into the variable DotProduct at Block 56. If i is less than equal to 4 at Block 57, i is incremented at Block 58 and the process continues until i is equal to 4.

These operations are performed for each compartment. They are preferably performed simultaneously, although they can be performed sequentially. The outputs from the compartments are then averaged to obtain the collective output at Block 59

The metric of this output represents the average distance of any one case to the entire set of cases in memory. The values it produces are intuitive as well. In some sense, the output is a measure of how many past cases support the current case. Moreover, this measure of support is more sophisticated than merely counting the number exact matches to the current case. The bipolarization of the transfer function and representing the memories as function counts rather than case counts can generate an output more sensitive to all memories and their support for the current case—or their distance (separation) from the current case.

The support from each compartment is from only one perspective. To measure the support of the entire network of compartments, all compartment outputs are averaged. In some sense, each compartment delivers its vote of support, based only on two inputs at a time. Like a Hopfield network, a distance metric between the entire input vector and the case memory is an emergent property of the entire distributed representation.

As so far described, the prediction functions base their output on a distance metric of the new case to the body of past cases. This distance function can distinguish between a robin, ostrich, and platypus if asked about membership in the class bird. On the other hand, another metric may also be used when making decisions: confidence. This metric may be formally based on statistical confidence. Intuitively, confidence is a measure of experience. While distance between memories is based on experience, the overall amount of experience and clarity of all the examples may be used to gate the memory's output. A young memory should report a weaker output than an older memory. Moreover, between compartments of the same age, a strong, clear relationship between two inputs should have more confident expression compared to a more confused or fuzzy pattern.

The confidence algorithm preferably is compartment-based. Each compartment may measure its own statistical confidence by a conventional non- parametric test for 2×2 tables.

Significance tests such a chi-squared are preferred for agent-based learning because, in the same philosophy as for this learning algorithm, they are non-parametric. There are no underlying assumptions about the population/problem from which data is collected.

The calculation preferably is based on the raw case counts. Given a 2×2 matrix of raw observations and assuming an even distribution of the counts if random, the expected value, E(A,B), is the average value of all four counts:

$E(A,B)$=Total Memories/4

Given the raw counts and the expected value, Yate's chi-square is calculated as $$X^2 = \sum \frac{(Observed_{case} - Expected - 0.5)^2}{Expected}$$

across all four case counts. Yate's correction for 2×2 matrices is shown as the 0.5 adjustment within the squared error term.

The probability distribution of this formula can be inaccurate if the expected value is less than 5. This can be likened as the minimal experience required of the agent in order to have confidence about its confidence. This strict requirement for measuring probability may use 20 memories in total, but if the probability is not being used for purposes of statistical testing, chi-squared error provides a good relative measure of confidence and the minimal experience requirements can be set arbitrarily by the application. This algorithm uses chi-squared error in such a relative way. The probability of the error (given by table look-up) is used to weight the output of each compartment. Clearer views of the Boolean space vote more strongly that less clear views.

JAVA computer language

Although not required for purposes of providing a complete written description of the invention or the best mode for carrying out the invention, a JAVA computer language implementation will now be provided.

Accessibility of applications to these memory functions may be as important as the memory itself. It may also be important to allow flexibility and improvement of the algorithm without affecting the client application. Therefore, aside from implementing the core computations described above, attachment to the input values and management of the compartments is provided by the following classes.

Class Sensor

This memory is intended to be included in an Agent Builder Environment, in which IAFact and IAFactSet are used as the attribute-value objects for passing event-based or active sensor-based information to ABE engines. As such an engine, this implementation should use IAFact and IAFactSet as well. As a general introduction to the algorithm, however, this class is based on JAVA computer language's String class, but the overall design pattern for how sensors clamp to an input representation and provide their state information to the core algorithm may remain the same. There may be one exception: Rather than the true/false sensing of whether a substring is found in a string, a more formal basis in bound facts and unbound variables allows for true/false/unknown states. This may allow the algorithm to handle uncertainty, but this elaboration will not be described.

```
import java.lang.String ;
public class Sensor {
    String      matchFilter;
    boolean     active;
    int         signal;
    long        error;
///////////////////////////////////////////////////////////
Sensor(String aKeyword) {
        matchFilter = new String(aKeyword);
        active = true;    // using string sensor, it is always active
        signal = 0;
        error = 0;
} \\ end constructor
```

StringSensor holds a String as its match filter. Given this string in its construction, the sensor will signal true or false if it finds its match filter in another string. The following methods are basic get/set methods for matchFilter.

```
///////////////////////////////////////////////////////////
public void setMatchFilter(String aKeyword) {
        matchFilter = null;
        matchFilter = new String(aKeyword);
} // end setMatchFilter
///////////////////////////////////////////////////////////
public String getMatchFilter( ) {
        return matchFilter;
} // end getMatchFilter
```

The primary method call at runtime is a request to the sensor to "clamp" itself to some new input string.

```
///////////////////////////////////////////////////////////
public void clampToInput(String aString) {
        if (aString.indexOf(matchFilter) != -1) {
                signal = 1;
        } else {
                signal = 0;
        }
} // end clampToInput
```

Given a string, each sensor searches for its matchFilter and, depending on the result, sets its output signal to true or false. This string search technique may be very inefficient within the String class. This StringClass shows how the sensor uses a matchFilter, but the object used as an argument for clamping should provide a fast search method. Given the sensor's clamping to some input representation, the downstream connections to each sensor can ask the sensor for its state.

```
///////////////////////////////////////////////////////////
public boolean getSignal( ) {
        return signal;
} // end getSignal
```

The following sensor methods are provided for autoassociative recall, which has not yet been discussed. However, the implementation can be seen as supporting the Hopfield network relaxation technique. Depending upon the sensor's accumulated error (which still needs to be defined), its state can toggle true or false.

```
///////////////////////////////////////////////////////////
public void initError(long initError) {
        error = initError;
} // end initError
///////////////////////////////////////////////////////////
public void changeError(long deltaError) {
        error += deltaError;
} // end changeError
///////////////////////////////////////////////////////////
public long getError( ) {
        return error;
} // end getError
public void clampToError( ) {
        if (error > 0) {
                signal = 1;
        } else {
                signal = 0;
        }
} // end clampToError
} // end class Sensor
```

A class hierarchy of sensors can be developed but the present implementation provides this algorithm with sensors based only on IAFact and IAFactSet. This will allow the application accessing techniques of Agent Builder's adapter design to marshalling data from across any range of applications into this KIF-like, standard representation. Furthermore, this design allows other modules to independently participate in adding to the input vector. For instance, derived facts can be added to the input vector through what have been called analyzers.

Interface Associative

Given a complete input signature, whether based on string or IAFactSet, the memory algorithm should be an implementation of a more abstract interface. This interface should represent the functional requires for agent-based learning as discussed, but other algorithms or improvements of this algorithm can also be provided.

```
import java.lang.String;
import java.util.Properties;
//////////////////////////////////////////////////////////////////
// interface Associative
//////////////////////////////////////////////////////////////////
interface Associative {
    // Structural sizing of input vector to sensors for keywords
    public void connectSensors(String newKeywords);
    public void disconnectSensors (String oldKeywords);
    // Control of memory content by writing and erasing memories
    public void memorize(String inputString);
    public void forget(String inputString);
    // Hetero-associative prediction reading of memories
    public long support(String inputString);
    public double membership(String inputString);
    // Auto-associative content-retrieval reading of memories
    public String nearest(String inputString);
    public String prototype(String inputString);
```

-continued

```
    // List and load representation using strings for human readable
    format
    public String asString( );
    public void fromString(String aString);
} // end interface Associative
```

Most of these abstract interface messages are understood from the discussions above. First, any associative implementation should allow the application to add and remove sensors. The associative interface encapsulates the sensors within it so the interface requires only that a list of the match filters be passed. This argument is a list; in the case of string, it can represent one or more new keywords or old keywords.

Memorize and forget messages can control the memory's content. Support and membership provide heteroassociative read-out. Support answers with the number of memories, membership answers with a normalized (−1 to +1) value given the total number of memories. Recall and prototype are for auto-associative function, not yet described. Recall returns the string closest to a given string, while prototype returns the "ideal" string, in the sense of that string most representing the neighborhood of memories.

Methods for listing the representation and loading it from storage are also provided.

JAVA computer language Properties are used to pass any required parameters. For instance, the application can decide whether or not to weight the memory's output by confidence. Such application choices (or algorithmic parameters, although there should be none) can be queried and set through this general mechanism.

Class Triangular

A triangular "neuron" is the composition of compartments described as the algorithm above. A triangular neuron implements the associative interface.

Class Compartment

This class provides the core algorithm described above.

```
//////////////////////////////////////////////////////////////////
// class Compartment
//////////////////////////////////////////////////////////////////
class Compartment {
    Sensor   sensors[ ];              // 2 sensors for each compartment
    long     counts[ ];               // 4 function counts
    int      functionRefs;            // 4 function codes, one for each count
    double   confidence;              // Chi-square confidence of memory pattern
    boolean  confidenceIsDated;       // Flag for signaling when confidence is dirty
    static int FUNCTIONMASK = 15;     // Mask to get/set 4 function codes
```

Each compartment accounts for the interaction between two sensors. Although 16 Boolean functions are possible between two sensor inputs, only four can coexist, so only four function counts are used, but then four function references are also used to keep track of which functions are being counted. Because the function reference only needs four bits, all four functionRefs can be held in one integer (16 bits could held in a USHORT, but this is not generally provided in the JAVA computer language). The FUNCTIONMASK is used to get and set each of the four functionRefs.

Confidence holds the probability value of the compartment's chi-squared error. Both the transfer function lookup table and the chi-squared distribution probabilities are provided by static arrays as follows:

```
private static final short transfer[ ][ ] = { {-4,-4,-4,-4},   // Never
                                              {+1,-1,-1,-3},   // NotB And NotA
                                              {-1,+1,-3,-1},   // NotB And A
                                              {+2,+2,-2,-2},   // NotB
                                              {-1,-3,+1,-1},   // B And NotA
                                              {+2,-2,+2,-2},   // NotA
                                              {-2,+2,+2,-2},   // NotEquals
                                              {+3,+1,+1,-1},   // NotB Or NotA
                                              {-3,-1,-1,+1},   // A And B
                                              {+2,-2,-2,+2},   // Equals
                                              {-2,+2,-2,+2},   // A
                                              {+1,+3,-1,+1},   // NotB Or A
                                              {-2,-2,+2,+2},   // B
                                              {+1,-1,+3,+1},   // B or NotA
                                              {-1,+1,+1,+3},   // A Or B
                                              {+4,+4,+4,+4}};  // Always
```

```
private static final float chDistr[ ][ ] = { {   .0100, .005},
                                             {   .0201, .010},
                                             {   .0506, .025},
                                             {   .1030, .050},
                                             {   .2110, .100},
                                             {   .5750, .250},
                                             {  1.3900, .500},
                                             {  2.7700, .750},
                                             {  4.6100, .900},
                                             {  5.9900, .950},
                                             {  7.3800, .975},
                                             {  9.2100, .990},
                                             { 10.6000, .995}};
```

Because the algorithm is so bit-oriented and could be very hard to read as compounded bit operations, the follow-up functions provide some semantic labeling of important steps. These functions are inline so that they are only for readability of the JAVA computer language code. The raw bit operators may be compounded when pre-compiled.

```
//////////////////////////////////////////////////////////////
// Return the position code form of the case represented by '00ba'
inline int getCase(int signalA, int signalB) {
    return 1 << ((signalB<<1) | (signalA));
} // end getCase
```

GetCase takes the signals of two sensors and provides the case these signals represent. The B signal is made the high bit by shifting left and combining with A as the low bit. Then 1 bit is left shifted by this number (0, 1, 2, or 3). This codes all four cases as 0001, 0010, 0100, or 1000.

```
//////////////////////////////////////////////////////////////
// Return whether of not the case can he added to the function
inline boolean isWritable(int inputCase, int function) {
    return (inputCase & function) == 0;
} // end isWritable
//////////////////////////////////////////////////////////////
// Return whether of not the case can be removed from the function
inline boolean isErasable(int inputCase, int function) {
    return (inputCase & function) != 0;
} // end isErasable
```

IsWritable takes an input case and a function code (such as function 1110, the A OR B function), answering true if the case is contained in the function. Because the case and function representations are isomorphic bit patterns, a case can be added to a function if the bit-wise ANDing of the two is not null. Otherwise, a case is erasable from a function. The inline function isErasable is provided for readability of the later functions.

```
//////////////////////////////////////////////////////////////
// Return the function caused by writing the case to the function
inline int getMemorizeFunction(int inputCase, int function) {
    return inputCase | function;
} // end getMemorizeFunction
//////////////////////////////////////////////////////////////
// Return the function caused by erasing the case from the function
inline int getForgetFunction(int inputCase, int function) {
    return (~inputCase) & function;
} // end getForgetFunction
```

Memorize and forget transition are also bit-wise operations between a case and a function. A function memorizes a case by bit-wise ORing of the two, assuming that the case is not already contained in the function. Forgetting a case uses the bit-wise ANDing of the compliment of the case with the function, assuming that the case is contained in the function. Given a function index, both inline functions result in a new function index.

```
//////////////////////////////////////////////////////////////
// Return the function (0–15) held in the iith 4-bits of functionRefs
int getFunctionRef(int ii) {
    if (ii < 0) return 0;
    if (ii > 3) return 15;
    ii = ii << 2;
    return ((functionRefs >> ii) & FUNCTIONMASK);
} // end getFunctionRef
//////////////////////////////////////////////////////////////
// Set the iith 4-bit field of functionRefs to reference function
int setFunctionRef(int ii, int function) {
    ii = ii << 2;
    int mask = FUNCTIONMASK << ii;
    functionRefs = (functionRefs | mask)& ((function << ii) | ~mask);
    return functionRefs;
} // end setFunctionRef
```

GetFunctionRef and setFunctionRef take the index, ii, position (0 to 3) at which to get a function or set a function. GetFunctionRef shifts the FUNCTIONMASK left by 0, 4, 8, or 12 bits and uses this mask to extract four bits and shift them right again to a value of 0–16. SetFunctionRef shift the function to the desired position and inserts it into functionRefs by bit-wise ORing with the other functions in their positions.

A compartment is initialized to a known initial state, representing no memories and knowing that it knows no memories:

```
//////////////////////////////////////////////////////////////
public Compartment(Sensor initSensorA, Sensor initSensorB) {
    sensors    = new Sensor[2];
    sensors[0] = initSensorA;
    sensors[1] = initSensorB;
    functionRefs      = 0;
    confidence        = 0;
    confidenceIsDated = false;
} // end constructor
```

Each compartment is constructed by association of two sensors. The counts, function references, and confidence are initialized to 0.

```
////////////////////////////////////////////////////////////
public void memorize( ) {
    // Combine the sensor signals into a position code representing the case
    int inputCase = getCase(sensors[0].getSignal( ), sensors[1].getSignal( ));
    // Start at the OR functions (ii=2), find the highest function to add case
    int ii = 2;
    while (ii>=0 && (counts[ii]==0 || !isWritable(inputCase, getFunctionRef(ii)))) {
        ii--;
    }
    // Write stored case by first decrementing the function memory to be written
    if (ii>=0) counts[ii]--;
    // And then incrementing the index representing the new, added memory
    counts[ii+1]++;
    if (counts[ii+1] == 1)
    {
        setFunctionRef(ii+1, getMemorizeFunction(inputCase, getFunctionRef(ii)));
    }
    // Calculate the probability of the case pattern based on chi-squared error
    confidenceIsDated = true;
} // end memorize
```

To memorize a case, the compartment searches for a function that does not already contain the case. For maximum entropy, the search begins with the largest functions first. The count array is used to store 1-bit Boolean functions (ANDs) at index 0 (ii=o); 2-bit functions (such as XOR) are stored at index 1; 3-bit functions (ORs) are stored at index 2; the 4-bit function (Always) is counted at index 3. Given a case, the search loop begins at 2 because the Always function cannot be written to (all its case positions are already true). The while loop searches for place that has a count of some function and the function can absorb the new case.

Finding this index, the function count is decremented and the next count is incremented. Based on the same reasoning of why only 4 functions can coexist, the implementation can also provide that promotion of one function to another can only create the same function that already exists, if in fact it already exists. In other words, if a count of ORs coexists with a count of XORs, their rotations are such that an XOR transition to an OR is the same OR as already exists. Because of this, the functionRef needs to be set only when any count changes from 0 to 1.

The compartment does not know whether more cases will be loaded next, or if the memory will be read, whether confidence will be used. Therefore, the confidence is simply marked as dirty in case it needs recalculation later.

```
////////////////////////////////////////////////////////////
public void forget( ) {
    // Combine the senor signals into a position code representing the case
    int inputCase = getCase(sensors[0].getSignal( ), sensors[1].getSignal( ));
    // Start at NEVER, find the highest function that can remove the old case
    int ii = 0;
    while (ii<4 && (counts[ii]==0 || !isErasable(inputCase, getFunctionRef(ii)))) {
        ii++;
    }
    if (ii >= 4) return;
    // Remove the stored case by first decrementing the function memory to be written
    if (ii < 4) counts[ii]--;
    if (ii > 0) counts[ii-1]++;
    // And then incrementing the index representing the function with the case removed
    if ((ii > 0) && (counts[ii-1] == 1)) {
        setFunctionRef(ii-1, getForgetFunction(inputCase, getFunctionRef(ii)));
    }
    // Calculate the probability of the case pattern based on chi-squared error
    confidenceIsDated = true;
} // end forget
```

Forgetting is the compliment of memorizing. The while loop starts at the AND function index and searches for the smallest function from which the case can be removed. Because the search is through the counts array in the opposite direction from memorize, the boundary conditions on the resulting index may be slightly different.

The implementations for reading the memory are based on the calculation of dot products rather than bit-wise transition operators. Because the application decision to use or not use the confidence calculation is common for all compartments in a neuron, this property is passed by the neuron to each compartment.

```
public long support(boolean useConfidence) {
   // Combine the sensor signals into a position code representing the case
   int inputNumber =
   sensors[0].getSignal( ) | ( sensors[1].getSignal( ) << 1);
   // Calculate the dot product of the transfer functions and memories
   long dotProduct = 0;
   // For each counts, accumulate the dot product
   for (short ii =0; ii<4; ii++) {
      if (counts[ii] > 0) {
         dotProduct += counts[ii] * transfer[getFunctionRef(ii)]
         [inputNumber];
      }
   }
   // If support needs weighting by confidence, multiply with dot product
   if (useConfidence) {
      if (confidenceIsDated) {
         setConfidence( );
      }
      dotProduct *= confidence;
   }
   return dotProduct;
} // end support
```

Given an input case, the compartment calculates the dot product of the function counts and transfer values of the case given each function. Looping through each count, if the count is not zero, the count is multiplied by the transfer value of the case and this is accumulated as the dot product. If confidence is to be used, then it is multiplied by the dot product.

```
public double membership(boolean useConfidence) {
   // Combine the sensor signals into a position code representing the case
   int inputNumber =
   sensors[0].getSignal( ) | ( sensors[1].getSignal( ) << 1);
   // Calculate the dot product of the transfer functions and memories
   long dotProduct = 0;
   long totalMemories = 0;
   for (short ii = 0; ii<4; ii++) {
      if (counts[ii] > 0) {
         dotProduct +=
         counts[ii] * transfer[getFunctionRef(ii)] [inputNumber];
         totalMemories += counts[ii];
      }
   }
   // Normalized the dot product to the total number of memories
   double membership = dotProduct / totalMemories;
   // If support needs weighting by confidence, multiply with dot product
   if (useConfidence) {
      if (confidenceIsDated) {
         setConfidence( );
      }
      membership *= confidence;
   }
   return membership;
} // end membership
```

Support and membership are similar.

```
private void setConfidence( ) {
   long observed[ ] = {0, 0, 0, 0};
   long totalMemories = 0;
   // Can be improved by thinking about function pattern but not its
   rotation for (short ii=0; ii<4; ii++) {
      if (counts[ii] > 0) {
         int i = getFunctionRef(ii);
         for (short inputCase=0; inputCase<4; inputCase++) {
            if (transfer[i][inputCase] > 0) {
               observed[inputCase] =+ counts[ii];
               totalMemories += counts[ii];
            }
         }
      }
   }
   // This will later be set as a Property through the Associative interface
   long minimumExperience = 1;
   double error = 0;
   if (totalMemories >= minimumExperience) {
      // Divide by 4 to get the average, expected value per cell
      long expected = totalMemories >> 2;
      for (short inputCase=0; inputCase<4; inputCase++) {
         double difference = observed[inputCase] - expected - .5;
         error += difference*difference * 4/totalMemories;
      }
   }
   int distrIndex = 0;
   while (distrIndex < 12 && error > chiDistr[distrIndex] [0]) {
      distrIndex++;
   }
   confidence = chiDistr[distrIndex] [1];
} // end setConfidence public void setSensorErrors(boolean useConfidence) {
   // Combine the sensor signals into a position code representing the
   case int inputCase =
   getCase(sensors[0].getSignal( ), sensors[1].getSignal( ));
   // For each sensor, toggle it and see the effect on the output
   for (short i=0; i<2; i++) {
      // Need to get operation that fips the ith bit;
      int toggleCase = inputCase   (1 << i);
      // Calculate the dot product of the transfer functions and
      memories
      long difference = 0;
      for (short ii =0; ii<4; ii++) {
         if (counts[ii] > 0) {
            long output = transfer[getFunctionRef(ii)] [inputCase];
            long toggle = transfer[getFunctionRef(ii)] [toggleCase];
            difference += counts[ii] * (output - toggle);
         }
      }
      // If support needs weighting by confidence, multiply with dot
      product
      if (useConfidence) {
         if (confidenceIsDated) {
            setConfidence( );
         }
         difference *= confidence;
      }
      sensors[i].changeError(difference);
   }
} // end setSensorErrors // Compartment is active if and only if both its sensors are active
public boolean isActive( ) {
   return sensor[0].isActive( ) && sensor[1].isActive( );
} // end isActive
} // end class Compartment
```

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An artificial neural network comprising:
    a plurality of artificial neurons; and
    a plurality of Boolean-complete compartments, a respective one of which couples a respective pair of artificial neurons, wherein a respective Boolean-complete compartment comprises:
    a collection of at least four Boolean functions that represent input vectors to the respective pair of artificial neurons, selected from sixteen possible Boolean functions that can represent input vectors to the respective pair of artificial neurons; and a count for each of the at least four Boolean functions, representing a number of occurrences of each of the at least four Boolean functions in input vectors to the respective pair of artificial neurons.

2. An artificial neural network according to claim 1 wherein the count represents a count of ALWAYS functions included in the input vectors, a count of residual OR functions remaining in the input vectors after counting the ALWAYS functions, a count of residual two bit functions remaining in the input vectors after counting the ALWAYS and OR functions, and a count of residual AND functions remaining in the input vectors after counting the ALWAYS, OR and two bit functions.

3. An artificial neural network according to claim 1 further comprising:

means for selecting the collection of at least four Boolean functions that represent input vectors to a respective pair of artificial neurons and for accumulating a count for each of the selected functions; and means for storing an indication of the selected collection of Boolean functions and the corresponding accumulated counts in the compartment that couples the respective pair of artificial neurons.

4. An artificial neural network according to claim 1 wherein each of the sixteen possible Boolean functions that can represent input vectors to the respective pair of artificial neurons is represented as a four bit bitwise OR of the input vectors.

5. An artificial neural network according to claim 3 wherein the collection of at least four Boolean functions is four Boolean functions.

6. An artificial neural network according to claim 1 wherein the collection of at least four Boolean functions is four Boolean functions.

7. An artificial neural network according to claim 3 wherein the selecting and accumulating means comprises:

first means for extracting a count of ALWAYS functions included in the input vectors;

second means, responsive to the first means, for extracting a count of residual OR functions remaining in the input vectors after extracting the count of ALWAYS functions;

third means, responsive to the second means, for extracting a count of residual two bit functions remaining in the input vectors after extracting the counts of ALWAYS and OR functions; and fourth means, responsive to the third means, for extracting a count of residual AND functions remaining in the input vectors after extracting the counts of ALWAYS, OR and two bit functions.

8. An artificial neural network according to claim 3 wherein each of the sixteen possible Boolean functions that can represent input vectors to the respective pair of artificial neurons is represented as a four bit bitwise OR of the input vectors represented by the Boolean function, and wherein the selecting and accumulating means comprises:

first means for bitwise ANDing the at least four Boolean functions with an input vector;

second means, responsive to the first means, for identifying a largest Boolean function that is TRUE when bitwise ANDed with the input vector; and third means, responsive to the second means, for decrementing the count of the largest Boolean function so identified and for incrementing the count of the next Boolean function following the largest Boolean function so identified.

9. An artificial neural network according to claim 1 further comprising a collection of transfer functions, a respective one of which is associated with a respective one of the sixteen possible Boolean functions.

10. An artificial neural network according to claim 9 further comprising:

means for reading the artificial neural network in response to an input vector, by combining the input vector, the counts and the associated transfer functions for the plurality of compartments.

11. An artificial neural network according to claim 10 wherein the reading means comprises means for calculating a dot product of an input vector to a respective pair of neurons, the transfer functions of the at least four Boolean functions of the compartment that is associated with the respective pair of neurons and the counts of the compartment that is associated with the respective pair of neurons.

12. An artificial neural network according to claim 11 wherein the reading means further comprises means, responsive to the calculating means, for averaging the dot products of the input vectors so calculated for the plurality of neurons.

13. An artificial neural network according to claim 1 further comprising means for encoding two bit input vectors to the respective pair of artificial neurons into a four bit representation in which only one bit is ONE.

14. An artificial neural network according to claim 13 wherein the encoding means comprises means for encoding a 00 input to the respective pair of artificial neurons as 0001, a 01 input as 0010, a 10 input as 0100 and an 11 input as 1000.

15. A method of writing a plurality of input vectors into an artificial neural network comprising a plurality of artificial neurons, the writing method comprising the step of:

counting numbers of occurrences of at least four Boolean functions that represent a set of Boolean-complete functions in the input vectors for each pair of artificial neurons, wherein the counting step comprises the steps of:

extracting a count of ALWAYS functions included in the input vectors;

extracting a count of residual OR functions remaining in the input vectors after extracting the count of ALWAYS functions;

extracting a count of residual two bit functions remaining in the input vectors after extracting the counts of ALWAYS and OR functions; and extracting a count of residual AND functions remaining in the input vectors after extracting the counts of ALWAYS, OR and two bits functions.

16. A method according to claim 15 wherein the at least four Boolean functions is four Boolean functions.

17. A method according to claim 15 wherein each of sixteen possible Boolean functions that can represent input vectors for each pair of artificial neurons is represented as a four bit bitwise OR of the input vectors represented by the Boolean function, and wherein the counting step comprises the steps of:

bitwise ANDing the at least four Boolean functions with an input vector;

identifying a largest Boolean function that is TRUE when bitwise ANDed with the input vector;

decrementing a count of the largest Boolean function so identified; and incrementing a count of a Boolean function following the largest Boolean function so identified.

18. A method of reading an artificial neural network comprising a plurality of artificial neurons, in response to an input vector that is applied to the plurality of artificial neurons, the reading method comprising the step of:

combining the input vector, counts of at least four Boolean functions that are selected from sixteen possible Boolean functions that can represent input vectors to respective pairs of artificial neurons, the counts of at least four Boolean functions representing a number of occurrences of each of at least four Boolean functions in preceding input vectors to the respective pairs of artificial neurons, and transfer functions that are associated with the respective ones of the at least four Boolean functions.

19. A method according to claim 18 wherein the combining step comprises the step of:

calculating a dot product of an input vector to a respective pair of neurons, the transfer functions of the at least four Boolean functions that is associated with the respective pair of neurons and the counts of the at least four Boolean functions that is associated with the respective pair of neurons.

20. A method according to claim 14 further comprising the step of:

averaging the dot products of the input vectors so calculated for the plurality of artificial neurons.

21. A method according to claim 18 wherein the combining step is preceded by the step of:

encoding two bit input vectors to a respective pair of artificial neurons into a four bit representation in which only one bit is ONE.

22. A method according to claim 21 wherein the encoding step comprises the step of encoding a 00 input to the respective pair of artificial neurons as 0001, a 01 input as 0010, a 10 input as 0100 and an 11 input as 1000.

23. A computer program product for providing an artificial neural network, the computer program product comprising a computer-readable storage medium having computer-readable program code means embodied in the medium, the computer-readable program code means comprising:

computer readable program code means for providing a plurality of artificial neurons; and computer-readable program code means for providing a plurality of Boolean-complete compartments, a respective one of which couples a respective pair of artificial neurons, wherein a respective Boolean-complete compartment comprises:

computer-readable program code means for providing a collection of at least four Boolean functions that represent input vectors to the respective pair of artificial neurons, selected from sixteen possible Boolean functions that can represent input vectors to the respective pair of artificial neurons; and computer-readable program code means for providing a count for each of the at least four Boolean functions representing a number of occurrences of each of the at least four Boolean functions in input vectors to the respective pair of artificial neurons.

24. A computer program product according to claim 23 wherein the count represents a count of ALWAYS functions included in the input vectors, a count of residual OR functions remaining in the input vectors after counting the ALWAYS functions, a count of residual two bit functions remaining in the input vectors after counting the ALWAYS and OR functions, and a count of residual AND functions remaining in the input vectors after counting the ALWAYS, OR and two bit functions.

25. An computer program product according to claim 23 further comprising:

computer-readable program code means for selecting the collection of at least four Boolean functions that represent input vectors to a respective pair of artificial neurons and for accumulating a count for each of the selected functions; and computer-readable program code means for storing an indication of the selected collection of Boolean functions and the corresponding accumulated counts in the compartment that couples the respective pair of artificial neurons.

26. A computer program product according to claim 23 wherein each of the sixteen possible Boolean functions that can represent input vectors to the respective pair of artificial neurons is represented as a four bit bitwise OR of the input vectors represented by the Boolean function.

27. A computer program product according to claim 25 wherein the selecting and accumulating means comprises:

first computer-readable program code means for extracting a count of ALWAYS functions included in the input vectors;

second computer-readable program code means, responsive to the first means, for extracting a count of residual OR functions remaining in the input vectors after extracting the count of ALWAYS functions;

third computer-readable program code means, responsive to the second means, for extracting a count of residual two bit functions remaining in the input vectors after extracting the counts of ALWAYS and OR functions; and fourth computer-readable program code means, responsive to the third means, for extracting a count of residual AND functions remaining in the input vectors after extracting the counts of ALWAYS, OR and two bit functions.

28. A computer program product according to claim 25 Wherein the collection of at least four Boolean functions is four Boolean functions.

29. A computer program product according to claim 1 wherein the collection of at least four Boolean functions is four Boolean functions.

30. A computer program product according to claim 25 wherein each of the sixteen possible Boolean functions that can represent input vectors to the respective pair of artificial neurons is represented as a four bit bitwise OR of the input vectors represented by the Boolean function, and wherein the selecting and accumulating computer-readable program code means comprises:

first computer-readable program code means for bitwise ANDing the at least four Boolean functions with an input vector;

second computer-readable program code means, responsive to the first means, for identifying a largest Boolean function that is TRUE when bitwise ANDed with the input vector; and third computer-readable program code means, responsive to the second means, for decrementing the count of the largest Boolean function so identified and for incrementing the count of the next Boolean function following the largest Boolean function so identified.

31. A computer program product according to claim 23 further comprising computer-readable program code means for providing a collection of transfer functions, a respective one of which is associated with a respective one of the sixteen possible Boolean functions.

32. A computer program product according to claim 23 further comprising:

computer-readable program code means for reading the artificial neural network in response to an input vector, by combining the input vector, the counts and the associated transfer functions for the plurality of compartments.

33. A computer program product according to claim 32 wherein the reading means comprises computer-readable program code means for calculating a dot product of an input vector to a respective pair of neurons, the transfer functions of the at least four Boolean functions of the compartment that is associated with the respective pair of neurons and the counts of the compartment that is associated with the respective pair of neurons.

34. A computer program product according to claim 33 wherein the reading means further comprises computer-readable program code means, responsive to the calculating means, for averaging the dot products of the input vectors so calculated for the plurality of neurons.

35. A computer program product according to claim 23 further comprising computer-readable program code means for encoding two bit input vectors to the respective pair of artificial neurons into a four bit representation in which only one bit is ONE.

36. A computer program product according to claim 35 wherein the encoding means comprises computer-readable program code means for encoding a 00 input to the respective pair of artificial neurons as 0001, a 01 input as 0010, a 10 input as 0100 and an 11 input as 1000.

* * * * *

UNITED STATES PATENT AND TRADEMARK OFFICE
CERTIFICATE OF CORRECTION

PATENT NO.   : 6,052,679
DATED        : April 18, 2000
INVENTOR(S)  : Aparicio, IV It is certified that error appears in the above-identified patent and that said Letters Patent is hereby corrected as shown below:

Column 25, line 27, please delete "14" and substitute -- 19 -- therefor.
Column 25, line 37, please delete "the" and substitute -- a -- therefor
Column 26, line 7, please delete "An" and substitute -- A -- therefor.
Column 26, line 44, please delete "Wherein" and substitute -- wherein -- therefor.
Column 26, line 46, please delete "1" and substitute -- 23 -- therefor.

Signed and Sealed this

Twenty-seventh Day of February, 2001

Attest:

NICHOLAS P. GODICI

Attesting Officer

Acting Director of the United States Patent and Trademark Office